(12) United States Patent
Boecking

(10) Patent No.: US 6,497,220 B1
(45) Date of Patent: Dec. 24, 2002

(54) HIGH-PRESSURE CONNECTION FOR A FUEL INJECTION SYSTEM FOR INTERNAL COMBUSTION ENGINES

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,973
(22) PCT Filed: May 11, 2000
(86) PCT No.: PCT/DE00/01471
§ 371 (c)(1), (2), (4) Date: Mar. 30, 2001
(87) PCT Pub. No.: WO00/77388
PCT Pub. Date: Dec. 21, 2000

(30) Foreign Application Priority Data
Jun. 5, 1999 (DE) .......................................... 199 27 145

(51) Int. Cl.$^7$ .......................... F02M 55/00; F16L 41/08
(52) U.S. Cl. .......................... 123/469; 285/261; 285/266
(58) Field of Search ................................. 123/468, 469; 285/261, 266

(56) References Cited

U.S. PATENT DOCUMENTS 2,520,896 A * 8/1950 Smulski .................. 285/266 X
4,893,601 A * 1/1990 Sugao ........................ 123/468

FOREIGN PATENT DOCUMENTS

JP 4-285393 * 10/1992 ........... F16L/41/06

* cited by examiner

Primary Examiner—Tony M. Agenbright
(74) Attorney, Agent, or Firm—Ronald E. Greigg

(57) ABSTRACT

A high-pressure connection for a fuel injection system for internal combustion engines is proposed, which compensates for errors of alignment between the high-pressure line and the high-pressure connection without any bending stress being exerted on the high-pressure line.

14 Claims, 3 Drawing Sheets

HIGH-PRESSURE CONNECTION FOR A FUEL INJECTION SYSTEM FOR INTERNAL COMBUSTION ENGINES

CROSS-REFERENCE TO RELATED APPLICATIONS

This application is a 35 USC 371 application of PCT/DE 00/01471 filed on May 11, 2000.

BACKGROUND OF THE INVENTION

1. Field of Invention

This invention relates to high-pressure fluid conduit connections and more particularly to such connections useful in a fuel injection system for internal combustion engines.

2. Description of the Prior Art

Fuel injection systems for internal combustion engines are known which have a connection stub, a high-pressure line, a lock nut, and a sealing face, wherein the connection stub has a bore and a thread that are disposed concentrically to its longitudinal axis, and the high-pressure line on its end has a counterpart corresponding to the sealing face, which counterpart is pressed onto the sealing face by the lock nut screwed to the connection of this type stub. A high-pressure connection is known from German Published, Nonexamined Patent Application DE-OS 198 08 882 A1, in which a frustoconical sealing face adjoins the center bore of the connection stub. The corresponding counterpart of the high-pressure line is pressed onto this sealing face by means of a lock nut. This produces a sealing connection between the connection stub and high-pressure line.

A disadvantage of this known high-pressure connection is that the high-pressure line must extend precisely in the direction of the longitudinal axis of the connection stub, since the high-pressure connection allows no angular compensation.

SUMMARY OF THE INVENTION

The object of the present invention is to furnish a high-pressure connection which compensates for errors of alignment between the longitudinal axis of the connection stub and the high-pressure line, without sacrificing the tightness of the high-pressure connection and without requiring the high-pressure line to absorb undesired bending stresses.

This object is attained according to the invention by a high-pressure connection for a fuel injection system for internal combustion engines, which comprises a connection stub, a high-pressure line, a lock nut, and a sealing face, wherein the connection stub has a bore and a thread that are disposed concentrically to its longitudinal axis, and the high-pressure line on its end has a counterpart corresponding to the sealing face, which counterpart is pressed onto the sealing face by the lock nut screwed to the connection stub, and wherein the sealing face and the faces oriented toward one another of the lock nut and the counterpart have the form of a dome, and that the center points of the domes occupy the same geometric location.

Because of the spherical design of the sealing face, the counterpart and the lock nut, the high-pressure line can be introduced into the connection stub with errors of alignment, without this having any effect on the sealing face of the connection stub and of the counterpart. Thus in these cases as well, the tightness of the high-pressure connection is preserved in full. Furthermore, no unnecessary bending stresses, which lead to increased material stress, are introduced into the high-pressure line.

In one feature of the invention, the dome, toward the lock nut, of the counterpart is embodied as spherical ring disk, so that when the lock nut is tightened, the high-pressure line is not turned, and moreover the spherical ring disk can be made from a different material from the high-pressure line and its counterpart.

In another embodiment of the invention, a clamping ring is disposed between the lock nut and the counterpart, and its face toward the counterpart takes the form of a dome, so that because of the greater structural length, the seating of the counterpart in the sealing face causes only a slight lessening in the contact pressure.

In a further variant, the faces oriented toward one another of the clamping ring and lock nut are circular-annular faces, so that the friction between the clamping ring and the lock nut becomes minimal.

Another variant of the invention provides that the through bores of the lock nut and clamping ring are embodied conically, and the bore diameter increases as the spacing from the sealing face increases, so that even if there are relatively major errors of alignment, the high-pressure line can be introduced without deformation into the connection stub and screwed to it.

In a further aspect of the invention, the cone angle of the through bores is less than or equal to 10°, so that a maximum allowable error of alignment can be defined by the choice of the cone angle.

According to the invention, the connection stub is welded to a high-pressure fuel reservoir, to the housing of a high-pressure fuel pump, or to the housing of an injection valve, so that the connection stub can be manufactured separately and can be joined in a simple, economical way to the high-pressure fuel reservoir or to one of the aforementioned housings.

Another variant provides that the connection stub is screwed to a high-pressure fuel reservoir, to the housing of a high-pressure fuel pump, or to the housing of an injection valve, so that the high-pressure connection according to the invention can be used even in existing injection systems by being exchanged for the existing high-pressure connections.

In a further feature of the invention, the connection stub and the high-pressure fuel reservoir, the connection stub and the housing of the high-pressure fuel pump, or the connection stub and the housing of the injection valve are embodied in one piece, in particular as a forged part, so that the number of components and joining connections is minimized. Furthermore, a favorable course of material stress can be achieved.

Another embodiment of the invention provides that the sealing face is part of the high-pressure fuel reservoir, of the housing of the high-pressure fuel pump, or of the housing of the injection valve, so that the structural height of the high-pressure connection of the invention is reduced.

In another variant, the sealing face is part of the connection stub, so that the high-pressure connection can be produced independently of the other component groups of the fuel injection system and economically. Furthermore, the geometrical association of the connection stub and the sealing face is always preserved.

A feature of the invention provides that the lock nut has a female thread, and the connection stub has a corresponding male thread, so that the rated diameter of the thread is markedly greater than the outside diameter of the sealing face, and thus high contact pressures are feasible.

In a further feature of the invention, the lock nut has a male thread, and the connection stub has a corresponding female thread, so that the outer diameter of the connection stub and thus the requisite installation space as well are minimized.

The objects stated above are also attained by a fuel injection system for internal combustion engines, having a high-pressure connection, which has a connection stub, a high-pressure line, a lock nut, and a sealing face, wherein the connection stub has a bore and a thread that are disposed concentrically to its longitudinal axis, and the high-pressure line on its end has a counterpart corresponding to the sealing face, which counterpart is pressed onto the sealing face by the lock nut screwed to the connection stub, and wherein the sealing face and the faces oriented toward one another of the lock nut and the counterpart have the form of a dome, and that the center points of the domes occupy the same geometric location.

BRIEF DESCRIPTION OF THE DRAWINGS

Further advantages and features of the invention will become apparent from the ensuing description taken with, the drawing, in which.

DESCRIPTION OF THE PREFERRED EMBODIMENTS

Figure 1:
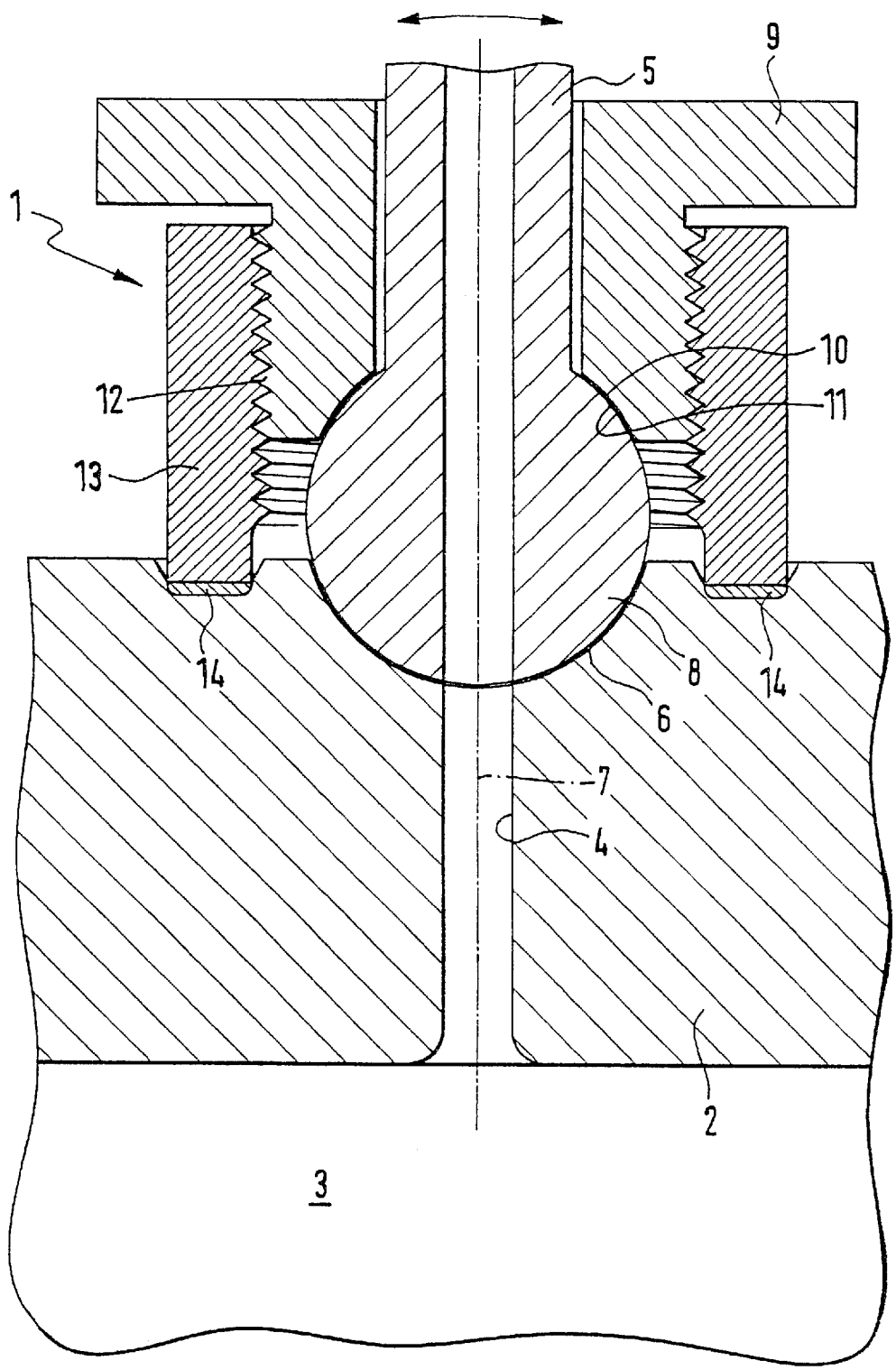
FIG. 1: a first embodiment of a high-pressure connection.

In the embodiment shown in FIG. 1, a high-pressure connection 1 is joined to a reservoir wall 2 of a high-pressure fuel reservoir 3. A bore 4 in the reservoir wall 2 establishes a hydraulic communication with a high-pressure line 5. The task of the high-pressure connection 1 is to seal off the hydraulic communication between the bore 4 and the high-pressure line 5 and in so doing to compensate for errors of alignment between the bore 4 and the high-pressure line 5. A sealing face 6 in the reservoir wall 2 has the form of a spherical surface (dome); the center point of the sphere or dome coincides with the longitudinal axis 7 of the bore 4.

A counterpart 8 communicating with the high-pressure line 5 is embodied spherically on its end as well, so that the sealing face 6 and the counterpart 8 press into one another. When the counterpart 8 is pressed onto the sealing face 6 by a lock nut 9, the result is a fluid-tight communication between the high-pressure line 5 and the high- pressure fuel reservoir 3.

In the example shown, the counterpart 8, on its face 10 toward the lock nut 9, has a spherical shape. The face 11 of the lock nut 9 oriented toward the counterpart 8 is likewise embodied spherically, so that the face 10 of the counterpart 8 and the corresponding face 11 of the lock nut 9 press into one another.

The center points of the spherical sealing face 6 and of the spherical part of the lock nut 9 are located at the same geometric location. This assures that the contact pressure generated by the lock nut 9, which pressure presses the counterpart 8 into the sealing face 6, is independent of any error of alignment of the high-pressure line 5.

The lock nut 9 has a male thread 12, which is screwed into a corresponding female thread of a connection stub 13. In the example shown, the connection stub 13 is joined to the reservoir wall 2 by a weld seam 14.

Figure 3:
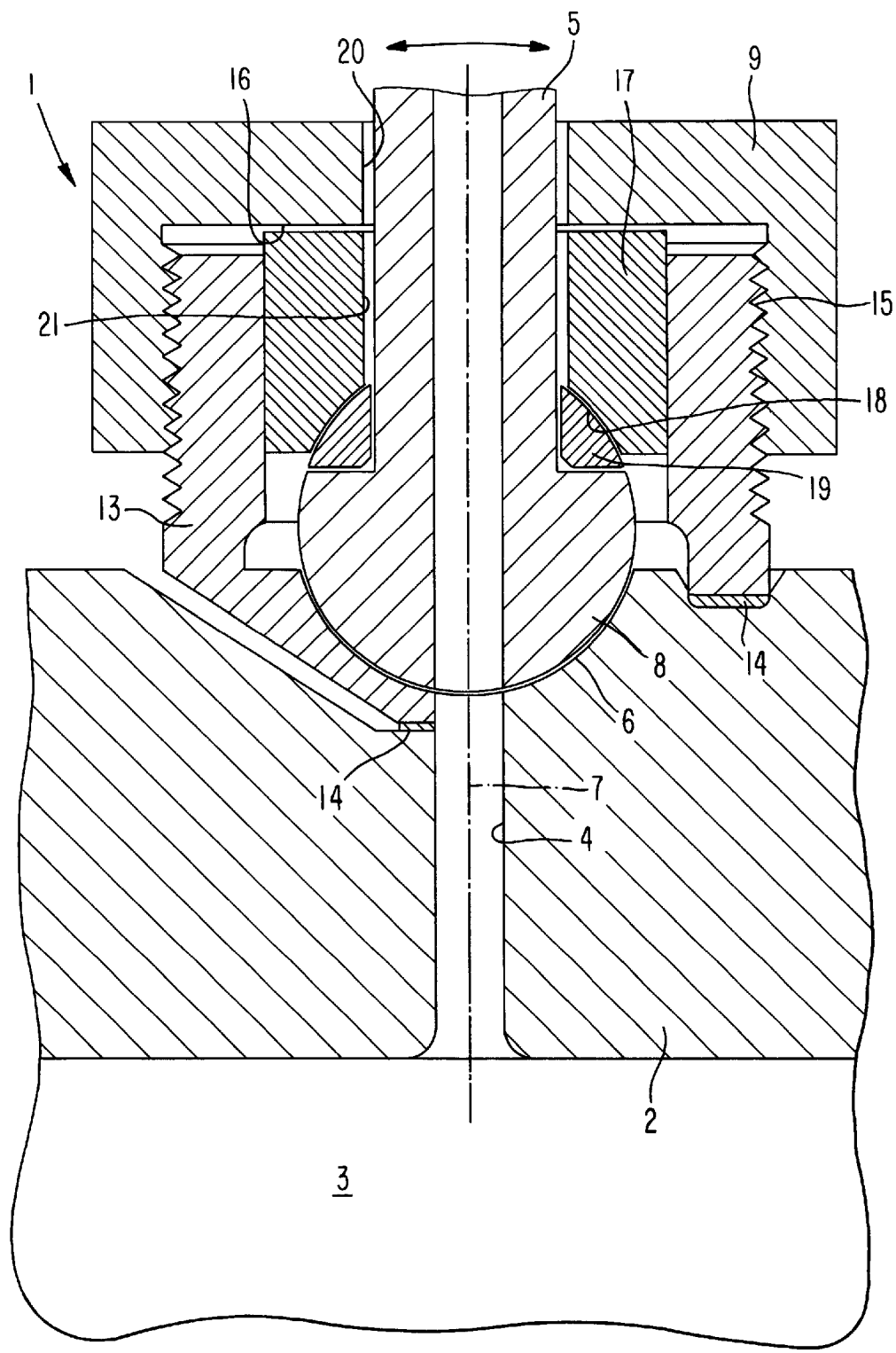
FIG. 3: an embodiment of the invention wherein the connection stub includes the sealing face.

As shown in FIG. 3, it is also possible for the connection stub 13 and the reservoir wall 2 to be made in one piece, for instance by forging, or more particularly shown in FIG. 3, for the sealing face 6 and the connection stub 13 to be embodied in one piece and for this component to be welded in its entirety to the reservoir wall 2. Regardless of this, despite any error of alignment of the high-pressure line 5, the contact pressure operative between the counterpart 8 and the sealing face 6 remains effective without change and without any shear force component.

Figure 2:
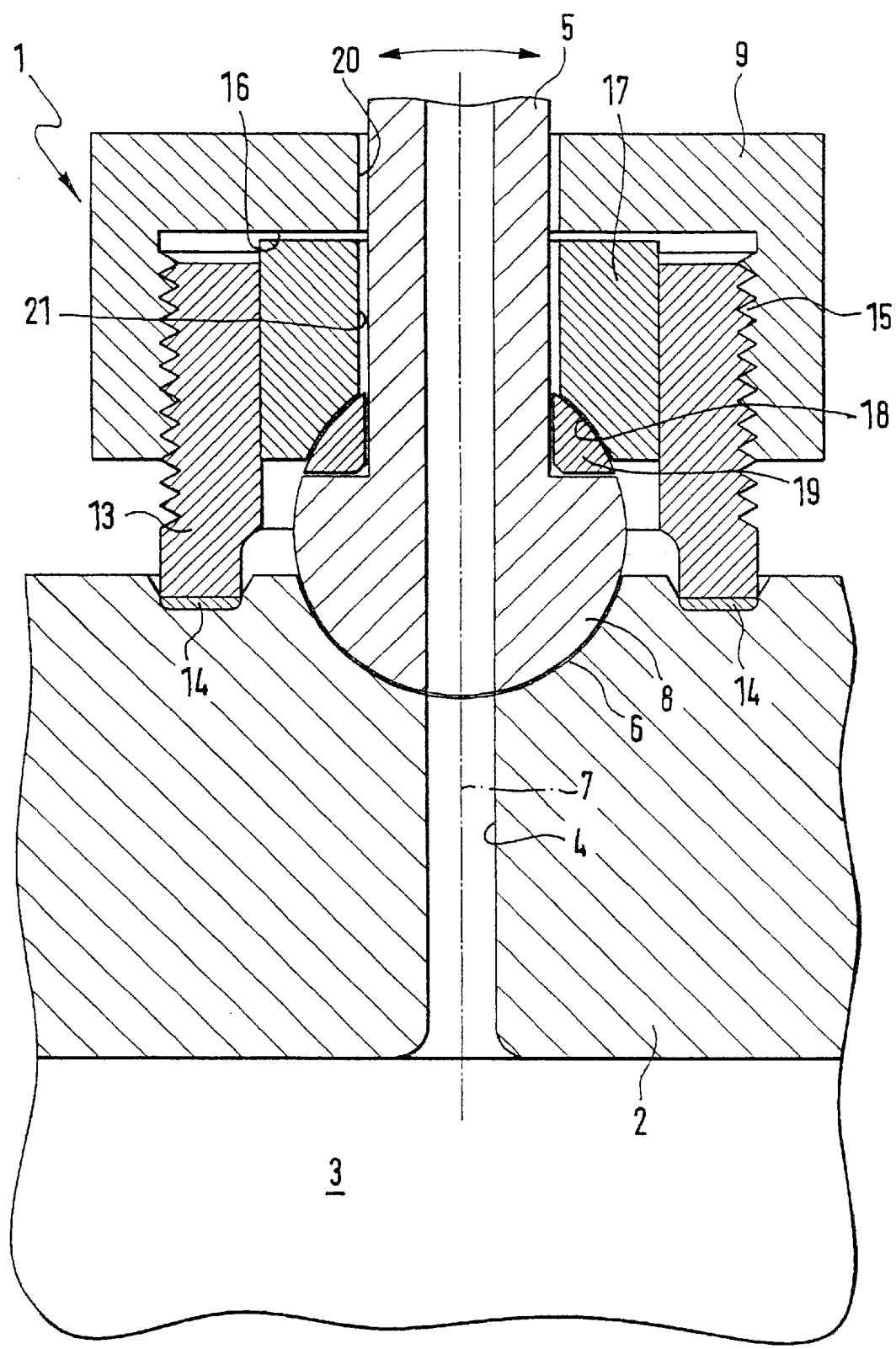
FIG. 2: a second embodiment of a high-pressure connection with a spherical ring disk and a clamping ring.

In FIG. 2, a different exemplary embodiment of the invention is shown. In this embodiment, the lock nut 9 is embodied as a union nut, which is screwed with its female thread 15 onto a corresponding male thread of the connection stub 13. A collar 16 of the lock nut 9 transmits the contact pressure to a clamping ring 17. The clamping ring 17, on its face toward the counterpart 8, has a spherical recess 18, which cooperates with a spherical ring disk 19. Accordingly, the contact pressure is transmitted from the lock nut 9 via the clamping ring 17 and the spherical ring disk 19 to the counterpart 8 and finally to the sealing face 6.

The advantage of this embodiment is that the lock nut 9, clamping ring 17, spherical ring disk 19 and counterpart 8 can each be made of different materials, so that the requirements made of each of these components can be met in an optimal way. For instance, the compression strength of the counterpart 8 is of great significance. The spherical ring disk 19 should have not only good compression strength but also a low coefficient of friction, so that the rotary motion that may be transmitted from the lock nut 9 through the clamping ring 17 will not be transmitted onward to the counterpart 8. Such twisting of the counterpart 8 would lead to a torsion of the high-pressure line 5 and thus to an unnecessary and undesired stress on the high-pressure line 5.

In the embodiment shown in FIG. 2, the rigidity of the high-pressure connection with regard to the contact pressure exerted by the lock nut 9 can be varied structurally within wide limits. Because the clamping ring 17 is made longer and is made from a material with a low modulus of elasticity, the contact pressure does not build up until after a relatively major rotary motion of the lock nut 9. This has the advantage that the contact pressure can be set more precisely, and any seating that may exist between the sealing face 6 and the counterpart 8, or between one or more of the other contact faces between the counterpart 8 and the spherical ring disk 19, or the spherical ring disk 19 and the clamping ring 17, or the clamping ring 17 and the collar 16, causes only a slight drop in the contact pressure.

In the example shown, the high-pressure line 5 is extended through a bore 20 of the lock nut 9 and a bore 21 of the clamping ring 17. In FIG. 2, the diameter of the bore 20 of the lock nut 9 and of the bore 21 of the clamping ring 17 is not much greater than the outside diameter of the high-pressure line 5. Thus the maximum possible error of alignment of the high-pressure line 5 relative to the bore 4 is fixed structurally. If the bores 20 and 21 are made conical, specifically in such a way that as the distance from the sealing face 6 increases the bore diameter also increases, then the maximum possible error of alignment can be very much greater.

In the example shown, the connection stub 13 is joined to the reservoir wall 2 by weld seams 14. Just as in the exemplary embodiment shown in FIG. 1, however, this need not necessarily be so.

The foregoing relates to preferred exemplary embodiments of the invention, it being understood that other variants and embodiments thereof are possible within the spirit and scope of the invention, the latter being defined by the appended claims.

I claim:

1. A high-pressure connection (1) for a fuel injection system for internal combustion engines, comprising a connection stub having a longitudinal axis (13), a high-pressure line (5), a lock nut (9), and a sealing face (6), said connection stub (13) having a bore and a thread that are disposed concentrically to said longitudinal axis (7), and the high-pressure line (5) on its end has a counterpart (8) on the end of said high-pressure line (5), said counterpart having a surface corresponding to the sealing face and being pressed onto the sealing face (6) by said lock nut (9) screwed to the connection stub (13), said sealing face (6) and the faces oriented toward one another of the lock nut (9) and the counterpart (8) have the form of a dome with the center points of the domes occupying a common geometric location, wherein that the dome surface of the counterpart (8) directed toward said lock nut (9) is embodied as a spherical ring disk (19).

2. The high-pressure connection (1) of claim 1, wherein said connection stub (13) is welded to a high-pressure fuel reservoir (3), to the housing of a high-pressure fuel pump, or to the housing of an injection valve.

3. The high-pressure connection (1) of claim 1, wherein the connection stub (13) is screwed to a high-pressure fuel reservoir (3), to the housing of a high-pressure fuel pump, or to the housing of an injection valve.

4. The high-pressure connection (1) of claim 1, wherein the connection stub (13) and the high-pressure fuel reservoir (3), the connection stub and the housing of the high-pressure fuel pump, or the connection stub and the housing of the injection valve are embodied in one piece, in particular as a forged part.

5. The high-pressure connection (1) of claim 1, wherein the sealing face (6) is part of the high-pressure fuel reservoir (3), of the housing of the high-pressure fuel pump, or of the housing of the injection valve.

6. The high-pressure connection (1) of claim 1, wherein the sealing face (6) is part of the connection stub (13).

7. The high-pressure connection (1) of claim 1, wherein the lock nut (9) has a female thread (15), and the connection stub (13) has a corresponding male thread.

8. The high-pressure connection (1) of claim 1, wherein that the lock nut (9) has a male thread (12), and the connection stub (13) has a corresponding female thread.

9. The high-pressure connection (1) of claim 1, wherein the through bores (20, 21) of the clamping ring (17) are embodied conically, and the bore diameter increases as the spacing from the sealing face (6) increases.

10. A high-pressure connection (1) for a fuel injection system for internal combustion engines, comprising a connection stub having a longitudinal axis (13), a high-pressure line (5), a lock nut (9), and a sealing face (6), said connection stub (13) having a bore and a thread that are disposed concentrically to said longitudinal axis (7), and the high-pressure line (5) on its end has a counterpart (8) on the end of said high-pressure line (5), said counterpart having a surface corresponding to the sealing face and being pressed onto the sealing face (6) by said lock nut (9) screwed to the connection stub (13), said sealing face (6) and the faces oriented toward one another of the lock nut (9) and the counterpart (8) have the form of a dome with the center points of the domes occupying a common geometric location, further comprising a clamping ring (17) disposed between said lock nut (9) and said counterpart (8), said clamping ring having a face directed toward the counterpart (8) in the form of a dome, wherein the through bores (20, 21) of the lock nut (9) and clamping ring (17) are embodied conically, and the bore diameter increases as the spacing from the sealing face (6) increases.

11. The high-pressure connection (1) of claim 10, wherein the faces oriented toward one another of the clamping ring (17) and lock nut (9) are circular-annular faces.

12. The high-pressure connection (1) of claim 10, wherein the cone angle of the through bores (20, 21) is less than or equal to 10°.

13. A high-pressure connection (1) for a fuel injection system for internal combustion engines, comprising a connection stub having a longitudinal axis (13), a high-pressure line (5), a lock nut (9), and a sealing face (6), said connection stub (13) having a bore and a thread that are disposed concentrically to said longitudinal axis (7), and the high-pressure line (5) on its end has a counterpart (8) on the end of said high-pressure line (5), said counterpart having a surface corresponding to the sealing face and being pressed onto the sealing face (6) by said lock nut (9) screwed to the connection stub (13), said sealing face (6) and the faces oriented toward one another of the lock nut (9) and the counterpart (8) have the form of a dome with the center points of the domes occupying a common geometric location, wherein the through bore (20) of the clamping ring (17) are embodied conically, and the bore diameter increases as the spacing from the sealing face (6) increases.

14. The high-pressure connection (1) of claim 13, wherein the cone angle of the through bore (20) is less than or equal to 10°.

* * * * *

UNITED STATES PATENT AND TRADEMARK OFFICE
CERTIFICATE OF CORRECTION

PATENT NO.     : 6,497,220 B1
DATED          : December 24, 2002
INVENTOR(S)    : Friedrich Boecking It is certified that error appears in the above-identified patent and that said Letters Patent is hereby corrected as shown below:

<u>Title page,</u>
Item [30], Foreign Application Priority Data should read as follows
-- [30], Foreign Application Priority Data
         June 15, 1999 (DE) …………….. 1 99 27 145 --

Signed and Sealed this

First Day of April, 2003

JAMES E. ROGAN
*Director of the United States Patent and Trademark Office*